(12) United States Patent
Fujimura et al.

(10) Patent No.: US 8,473,875 B2
(45) Date of Patent: Jun. 25, 2013

(54) METHOD AND SYSTEM FOR FORMING HIGH ACCURACY PATTERNS USING CHARGED PARTICLE BEAM LITHOGRAPHY

(75) Inventors: Akira Fujimura, Saratoga, CA (US); Kazuyuki Hagiwara, Tokyo (JP); Stephen F. Meier, Sunnyvale, CA (US); Ingo Bork, Mountain View, CA (US)

(73) Assignee: D2S, Inc., San Jose, CA (US)

( * ) Notice: Subject to any disclaimer, the term of this patent is extended or adjusted under 35 U.S.C. 154(b) by 0 days.

(21) Appl. No.: 13/168,954

(22) Filed: Jun. 25, 2011

(65) Prior Publication Data

US 2012/0096412 A1    Apr. 19, 2012

Related U.S. Application Data

(60) Provisional application No. 61/392,477, filed on Oct. 13, 2010.

(51) Int. Cl.
   *G06F 17/50*    (2006.01)

(52) U.S. Cl.
   USPC .......................................... 716/53

(58) Field of Classification Search
   USPC ................................... 716/50–56
   See application file for complete search history.

(56) References Cited

U.S. PATENT DOCUMENTS

| | | | |
|---|---|---|---|
| 6,037,601 A | 3/2000 | Okunuki | |
| 6,917,048 B2 | 7/2005 | Fujiwara et al. | |
| 7,759,027 B2 | 7/2010 | Fujimura et al. | |
| 7,799,489 B2 | 9/2010 | Fujimura et al. | |
| 7,901,850 B2 | 3/2011 | Fujimura et al. | |
| 2002/0129328 A1* | 9/2002 | Komatsuda | 716/21 |
| 2007/0114463 A1 | 5/2007 | Nakasugi et al. | |
| 2008/0116398 A1 | 5/2008 | Hara et al. | |
| 2010/0055580 A1 | 3/2010 | Fujimura et al. | |
| 2010/0055585 A1 | 3/2010 | Fujimura et al. | |
| 2010/0058279 A1 | 3/2010 | Fujimura et al. | |
| 2010/0058282 A1* | 3/2010 | Fujimura et al. | 716/21 |

(Continued)

FOREIGN PATENT DOCUMENTS

| | | |
|---|---|---|
| JP | 1992-155337 A | 5/1992 |
| WO | 03036386 A | 5/2003 |

(Continued)

OTHER PUBLICATIONS

Notice of Allowance dated Jul. 12, 2011 for U.S. Appl. No. 12/750,709.

(Continued)

*Primary Examiner* — Vuthe Siek
*Assistant Examiner* — Aric Lin
(74) *Attorney, Agent, or Firm* — The Mueller Law Office, P.C.

(57) ABSTRACT

A method and system for fracturing or mask data preparation for charged particle beam lithography are disclosed in which accuracy and/or edge slope of a pattern formed on a surface by a set of charged particle beam shots is enhanced by use of partially-overlapping shots. In some embodiments, dosages of the shots may vary with respect to each other before proximity effect correction. Particle beam simulation may be used to calculate the pattern and the edge slope. Enhanced edge slope can improve critical dimension (CD) variation and line-edge roughness (LER) of the pattern produced on the surface.

16 Claims, 8 Drawing Sheets

U.S. PATENT DOCUMENTS

| | | |
|---|---|---|
| 2010/0183963 A1 | 7/2010 | Zable et al. |
| 2011/0045409 A1 | 2/2011 | Fujimura |
| 2011/0053056 A1 | 3/2011 | Fujimura et al. |

FOREIGN PATENT DOCUMENTS

| | | |
|---|---|---|
| WO | 2010025031 A2 | 3/2010 |
| WO | 2010025032 A2 | 3/2010 |
| WO | 2011025795 A1 | 3/2011 |

OTHER PUBLICATIONS

Martin, L. et al., "New Writing Strategy in Electron Beam Direct Write Lithography to Improve Critical Dense Lines Patterning for Sub-45nm Nodes", Proceedings of SPIE, vol. 7470 (2009), pp. 74700R-1-74700R-12, SPIE, P.O. Box 10, Bellingham, WA. 98227, U.S.A.

Martin, L. et al., "Development of Multiple Pass Exposure in Electron Beam Direct Write Lithography for Sub-32nm Nodes", Proceedings of SPIE, vol. 7488 (2009), pp. 74881C-1-74881C-12, SPIE, P.O. Box 10, Bellingham, WA. 98227, U.S.A.

International Search Report and Written Opinion dated Apr. 27, 2012 for PCT Application No. PCT/US2011/055535.

International Search Report and Written Opinion dated Apr. 30, 2012 for PCT Application No. PCT/US2011/055536.

International Search Report and Written Opinion dated Sep. 13, 2012 for PCT Patent Application No. PCT/US2012/043042.

International Search Report and Written Opinion dated Dec. 20, 2012 for PCT Application No. PCT/US2012/054526.

\* cited by examiner

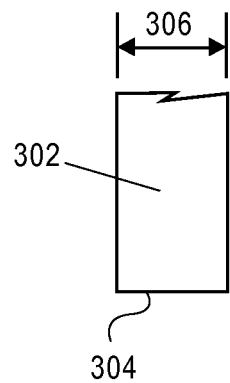
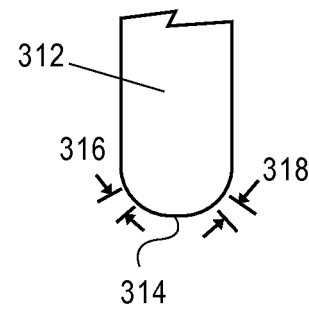
FIG. 3A  FIG. 3B
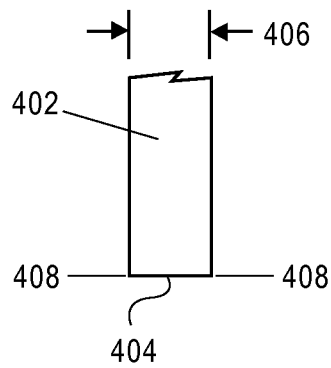
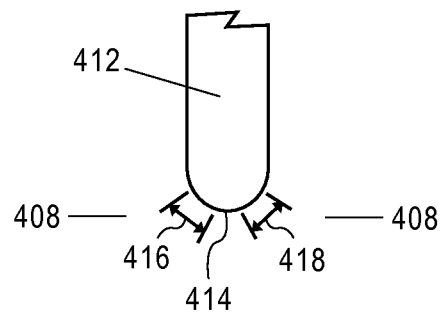
FIG. 4A  FIG. 4B
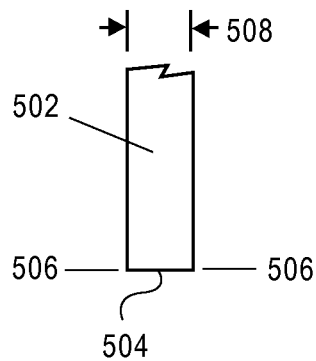
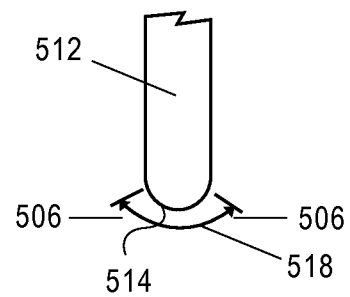
FIG. 5A  FIG. 5B

METHOD AND SYSTEM FOR FORMING HIGH ACCURACY PATTERNS USING CHARGED PARTICLE BEAM LITHOGRAPHY

RELATED APPLICATIONS

This application: 1) claims priority to U.S. Provisional Patent Application Ser. No. 61/392,477 filed on Oct. 13, 2010 and entitled "Method for Integrated Circuit Manufacturing and Mask Data Preparation Using Curvilinear Patterns"; and 2) is related to U.S. patent application Ser. No. 13/168,953 filed on Jun. 25, 2011 entitled "Method and System for Forming Patterns with Charged Particle Beam Lithography"; both of which are hereby incorporated by reference for all purposes.

BACKGROUND OF THE DISCLOSURE

The present disclosure is related to lithography, and more particularly to the design and manufacture of a surface which may be a reticle, a wafer, or any other surface, using charged particle beam lithography.

In the production or manufacturing of semiconductor devices, such as integrated circuits, optical lithography may be used to fabricate the semiconductor devices. Optical lithography is a printing process in which a lithographic mask or photomask manufactured from a reticle is used to transfer patterns to a substrate such as a semiconductor or silicon wafer to create the integrated circuit (I.C.). Other substrates could include flat panel displays, holographic masks, or even other reticles. While conventional optical lithography uses a light source having a wavelength of 193 nm, extreme ultraviolet (EUV) or X-ray lithography are also considered types of optical lithography. The reticle or multiple reticles may contain a circuit pattern corresponding to an individual layer of the integrated circuit, and this pattern can be imaged onto a certain area on the substrate that has been coated with a layer of radiation-sensitive material known as photoresist or resist. Once the patterned layer is transferred the layer may undergo various other processes such as etching, ion-implantation (doping), metallization, oxidation, and polishing. These processes are employed to finish an individual layer in the substrate. If several layers are required, then the whole process or variations thereof will be repeated for each new layer. Eventually, a combination of multiples of devices or integrated circuits will be present on the substrate. These integrated circuits may then be separated from one another by dicing or sawing and then may be mounted into individual packages. In the more general case, the patterns on the substrate may be used to define artifacts such as display pixels, holograms, or magnetic recording heads.

In the production or manufacturing of semiconductor devices, such as integrated circuits, non-optical methods may be used to transfer a pattern on a lithographic mask to a substrate such as a silicon wafer. Nanoimprint lithography (NIL) is an example of a non-optical lithography process. In nanoimprint lithography, a lithographic mask pattern is transferred to a surface through contact of the lithography mask with the surface.

In the production or manufacturing of semiconductor devices, such as integrated circuits, maskless direct write may also be used to fabricate the semiconductor devices. Maskless direct write is a printing process in which charged particle beam lithography is used to transfer patterns to a substrate such as a semiconductor or silicon wafer to create the integrated circuit. Other substrates could include flat panel displays, imprint masks for nano-imprinting, or even reticles. Desired patterns of a layer are written directly on the surface, which in this case is also the substrate. Once the patterned layer is transferred the layer may undergo various other processes such as etching, ion-implantation (doping), metallization, oxidation, and polishing. These processes are employed to finish an individual layer in the substrate. If several layers are required, then the whole process or variations thereof will be repeated for each new layer. Some of the layers may be written using optical lithography while others may be written using maskless direct write to fabricate the same substrate. Also, some patterns of a given layer may be written using optical lithography, and other patterns written using maskless direct write. Eventually, a combination of multiples of devices or integrated circuits will be present on the substrate. These integrated circuits are then separated from one another by dicing or sawing and then mounted into individual packages. In the more general case, the patterns on the surface may be used to define artifacts such as display pixels, holograms, or magnetic recording heads.

Two common types of charged particle beam lithography are variable shaped beam (VSB) and character projection (CP). These are both sub-categories of shaped beam charged particle beam lithography, in which a precise electron beam is shaped and steered so as to expose a resist-coated surface, such as the surface of a wafer or the surface of a reticle. In VSB, these shapes are simple shapes, usually limited to rectangles of certain minimum and maximum sizes and with sides which are parallel to the axes of a Cartesian coordinate plane (i.e. of "manhattan" orientation), and 45 degree right triangles (i.e. triangles with their three internal angles being 45 degrees, 45 degrees, and 90 degrees) of certain minimum and maximum sizes. At predetermined locations, doses of electrons are shot into the resist with these simple shapes. The total writing time for this type of system increases with the number of shots. In character projection (CP), there is a stencil in the system that has in it a variety of apertures or characters which may be complex shapes such as rectilinear, arbitrary-angled linear, circular, nearly circular, annular, nearly annular, oval, nearly oval, partially circular, partially nearly circular, partially annular, partially nearly annular, partially nearly oval, or arbitrary curvilinear shapes, and which may be a connected set of complex shapes or a group of disjointed sets of a connected set of complex shapes. An electron beam can be shot through a character on the stencil to efficiently produce more complex patterns on the reticle. In theory, such a system can be faster than a VSB system because it can shoot more complex shapes with each time-consuming shot. Thus, an E-shaped pattern shot with a VSB system takes four shots, but the same E-shaped pattern can be shot with one shot with a character projection system. Note that VSB systems can be thought of as a special (simple) case of character projection, where the characters are just simple characters, usually rectangles or 45-45-90 degree triangles. It is also possible to partially expose a character. This can be done by, for instance, blocking part of the particle beam. For example, the E-shaped pattern described above can be partially exposed as an F-shaped pattern or an I-shaped pattern, where different parts of the beam are cut off by an aperture. This is the same mechanism as how various sized rectangles can be shot using VSB. In this disclosure, partial projection is used to mean both character projection and VSB projection.

As indicated, in optical lithography the lithographic mask or reticle comprises geometric patterns corresponding to the circuit components to be integrated onto a substrate. The patterns used to manufacture the reticle may be generated utilizing computer-aided design (CAD) software or programs. In designing the patterns the CAD program may follow a set of pre-determined design rules in order to create the reticle. These rules are set by processing, design, and end-use limitations. An example of an end-use limitation is defining the geometry of a transistor in a way in which it cannot sufficiently operate at the required supply voltage. In particular, design rules can define the space tolerance between circuit devices or interconnect lines. The design rules are, for example, used to ensure that the circuit devices or lines do not interact with one another in an undesirable manner. For example, the design rules are used so that lines do not get too close to each other in a way that may cause a short circuit. The design rule limitations reflect, among other things, the smallest dimensions that can be reliably fabricated. When referring to these small dimensions, one usually introduces the concept of a critical dimension. These are, for instance, defined as the smallest width of a line or the smallest space between two lines, those dimensions requiring exquisite control.

One goal in integrated circuit fabrication by optical lithography is to reproduce the original circuit design on the substrate by use of the reticle. Integrated circuit fabricators are always attempting to use the semiconductor wafer real estate as efficiently as possible. Engineers keep shrinking the size of the circuits to allow the integrated circuits to contain more circuit elements and to use less power. As the size of an integrated circuit critical dimension is reduced and its circuit density increases, the critical dimension of the circuit pattern or physical design approaches the resolution limit of the optical exposure tool used in conventional optical lithography. As the critical dimensions of the circuit pattern become smaller and approach the resolution value of the exposure tool, the accurate transcription of the physical design to the actual circuit pattern developed on the resist layer becomes difficult. To further the use of optical lithography to transfer patterns having features that are smaller than the light wavelength used in the optical lithography process, a process known as optical proximity correction (OPC) has been developed. OPC alters the physical design to compensate for distortions caused by effects such as optical diffraction and the optical interaction of features with proximate features. OPC includes all resolution enhancement technologies performed with a reticle.

OPC may add sub-resolution lithographic features to mask patterns to reduce differences between the original physical design pattern, that is, the design, and the final transferred circuit pattern on the substrate. The sub-resolution lithographic features interact with the original patterns in the physical design and with each other and compensate for proximity effects to improve the final transferred circuit pattern. One feature that is used to improve the transfer of the pattern is a sub-resolution assist feature (SRAF). Another feature that is added to improve pattern transference is referred to as "serifs". Serifs are small features that can be positioned on a corner of a pattern to sharpen the corner in the final transferred image. It is often the case that the precision demanded of the surface manufacturing process for SRAFs are less than those for patterns that are intended to print on the substrate, often referred to as main features. Serifs are a part of a main feature. As the limits of optical lithography are being extended far into the sub-wavelength regime, the OPC features must be made more and more complex in order to compensate for even more subtle interactions and effects. As imaging systems are pushed closer to their limits, the ability to produce reticles with sufficiently fine OPC features becomes critical. Although adding serifs or other OPC features to a mask pattern is advantageous, it also substantially increases the total feature count in the mask pattern. For example, adding a serif to each of the corners of a square using conventional techniques adds eight more rectangles to a mask or reticle pattern. Adding OPC features is a very laborious task, requires costly computation time, and results in more expensive reticles. Not only are OPC patterns complex, but since optical proximity effects are long range compared to minimum line and space dimensions, the correct OPC patterns in a given location depend significantly on what other geometry is in the neighborhood. Thus, for instance, a line end will have different size serifs depending on what is near it on the reticle. This is even though the objective might be to produce exactly the same shape on the wafer. These slight but critical variations are important and have prevented others from being able to form reticle patterns. It is conventional to discuss the OPC-decorated patterns to be written on a reticle in terms of main features, that is features that reflect the design before OPC decoration, and OPC features, where OPC features might include serifs, jogs, and SRAF. To quantify what is meant by slight variations, a typical slight variation in OPC decoration from neighborhood to neighborhood might be 5% to 80% of a main feature size. Note that for clarity, variations in the design of the OPC are what is being referenced. Manufacturing variations, such as line-edge roughness and corner rounding, will also be present in the actual surface patterns. When these OPC variations produce substantially the same patterns on the wafer, what is meant is that the geometry on the wafer is targeted to be the same within a specified error, which depends on the details of the function that that geometry is designed to perform, e.g., a transistor or a wire. Nevertheless, typical specifications are in the 2%-50% of a main feature range. There are numerous manufacturing factors that also cause variations, but the OPC component of that overall error is often in the range listed. OPC shapes such as sub-resolution assist features are subject to various design rules, such as a rule based on the size of the smallest feature that can be transferred to the wafer using optical lithography. Other design rules may come from the mask manufacturing process or, if a character projection charged particle beam writing system is used to form the pattern on a reticle, from the stencil manufacturing process. It should also be noted that the accuracy requirement of the SRAF features on the mask may be lower than the accuracy requirements for the main features on the mask. As process nodes continue to shrink, the size of the smallest SRAFs on a photomask also shrinks For example, at the 20 nm logic process node, 40 nm to 60 nm SRAFs are needed on the mask for the highest precision layers.

Inverse lithography technology (ILT) is one type of OPC technique. ILT is a process in which a pattern to be formed on a reticle is directly computed from a pattern which is desired to be formed on a substrate such as a silicon wafer. This may include simulating the optical lithography process in the reverse direction, using the desired pattern on the substrate as input. ILT-computed reticle patterns may be purely curvilinear—i.e. completely non-rectilinear—and may include circular, nearly circular, annular, nearly annular, oval and/or nearly oval patterns. Since curvilinear patterns are difficult and expensive to form on a reticle using conventional techniques, rectilinear approximations of the curvilinear patterns may be used. In this disclosure ILT, OPC, source mask optimization (SMO), and computational lithography are terms that are used interchangeably.

EUV optical lithography has a much higher resolution than conventional optical lithography. The very high resolution of EUV significantly reduces the need for OPC processing, resulting in lower mask complexity for EUV than for 193 nm optical lithography. However, because of the very high resolution of EUV, imperfections in a photomask, such as excessive line edge roughness (LER), will be transferred to the wafer. Therefore, the accuracy requirements for EUV masks are higher than those for conventional optical lithography. Additionally, even though EUV mask shapes are not complicated by the addition of complex SRAFs or serifs required for conventional 193 nm lithography, EUV mask shapes are complicated by an addition of some complexities unique to EUV manufacturing. Of particular relevance in writing patterns on masks for EUV lithography is mid-range scattering of charged particles such as electrons, which may affect a radius of about 2 um. This midrange scattering introduces a new consideration for mask data preparation, because for the first time the influence from neighboring patterns has significant impact on the shape that a particular pattern would cast onto the mask surface. Previously, when exposing masks for use with conventional 193 nm lithography, the short-range scattering affected only the pattern being written, and the long-range scattering had a large enough effective range that only the size of a pattern, and not its detailed shape, was affected, making it possible to make corrections by only using dose modulation. In addition, since EUV processing of wafers is more expensive, it is desirable to reduce or eliminate multiple patterning. Multiple patterning is used in conventional optical lithography to allow exposure of small features by exposing patterns for one layer of wafer processing using multiple masks, each of which contains a portion of the layer pattern. Reducing or eliminating multiple exposures requires the single mask to contain more fine patterns. For example, a series of collinear line segments may be double-patterned by first drawing a long line, then cutting the line into line segments by a second mask in conventional lithography. The same layer written with a single mask, such as for EUV lithography, would require a mask containing many smaller line segments. The need to write larger numbers of finer patterns on a single mask, each pattern needing to be more accurate, increases the need for precision on EUV masks.

There are a number of technologies used for forming patterns on a reticle, including using optical lithography or charged particle beam lithography. The most commonly used system is the variable shaped beam (VSB), where, as described above, doses of electrons with simple shapes such as manhattan rectangles and 45-degree right triangles expose a resist-coated reticle surface. In conventional mask writing, the doses or shots of electrons are conventionally designed to avoid overlap wherever possible, so as to greatly simplify calculation of how the resist on the reticle will register the pattern. Similarly, the set of shots is designed so as to completely cover the pattern area that is to be formed on the reticle.

Reticle writing for the most advanced technology nodes typically involves multiple passes of charged particle beam writing, a process called multi-pass exposure, whereby the given shape on the reticle is written and overwritten. Typically, two to four passes are used to write a reticle to average out precision errors in the charged particle beam writer, allowing the creation of more accurate photomasks. Also typically, the list of shots, including the dosages, is the same for every pass. In one variation of multi-pass exposure, the lists of shots may vary among exposure passes, but the union of the shots in any exposure pass covers the same area. Multi-pass writing can reduce over-heating of the resist coating the surface. Multi-pass writing also averages out random errors of the charged particle beam writer. Multi-pass writing using different shot lists for different exposure passes can also reduce the effects of certain systemic errors in the writing process.

Current optical lithography writing machines typically reduce the photomask pattern by a factor of four during the optical lithographic process. Therefore, patterns formed on a reticle or mask must be four times larger than the size of the desired pattern on the substrate or wafer.

Current-technology charged particle beam writers, using conventional techniques, can resolve features as small as 100 nm. For features smaller than 100 nm, however, conventional writing techniques may fail to accurately resolve features. Additionally, manufacturing variation may produce unacceptable LER and critical dimension (CD) variation. This can be a problem for both conventional optical lithography, where OPC may produce SRAF's having mask dimensions smaller than 100 nm, and for EUV lithography, where the main mask patterns may be smaller than 100 nm and where mask specifications may be tighter than for masks used for conventional optical lithography.

SUMMARY OF THE DISCLOSURE

A method and system for fracturing or mask data preparation for charged particle beam lithography are disclosed in which accuracy and/or dose margin of a pattern formed on a surface by a set of charged particle beam shots is enhanced by use of partially-overlapping shots. In some embodiments, dosages of the shots may vary with respect to each other before proximity effect correction. Particle beam simulation may be used to calculate the pattern and the dose margin. Enhanced dose margin can improve critical dimension (CD) variation and line-edge roughness (LER) of the pattern produced on the surface.

BRIEF DESCRIPTION OF THE DRAWINGS

FIG. 3A illustrates an example of a desired 100 nm line-end pattern to be formed on a reticle;

FIG. 3B illustrates an example of a simulated pattern formed using shots generated by fracturing the pattern of FIG. 3A using conventional techniques;

FIG. 4A illustrates an example of a desired 80 nm line-end pattern to be formed on a reticle;

FIG. 4B illustrates an example of a simulated pattern formed using shots generated by fracturing the pattern of FIG. 4A using conventional techniques;

FIG. 5A illustrates an example of a desired 60 nm line-end pattern to be formed on a reticle;

FIG. 5B illustrates an example of a simulated pattern formed using shots generated by fracturing the pattern of FIG. 5A using conventional techniques;

DETAILED DESCRIPTION OF THE EMBODIMENTS

The present disclosure describes a method for enhancing the accuracy of charged particle beam exposure by use of overlapping shots. The present invention enhances the ability of charged particle beam systems to accurately produce patterns smaller than 100 nm on a reticle, with acceptable CD variation and LER in light of manufacturing variation. Additionally, the present invention expands the process window of manufacturing variations under which these accurate patterns may be produced.

Figure 1:
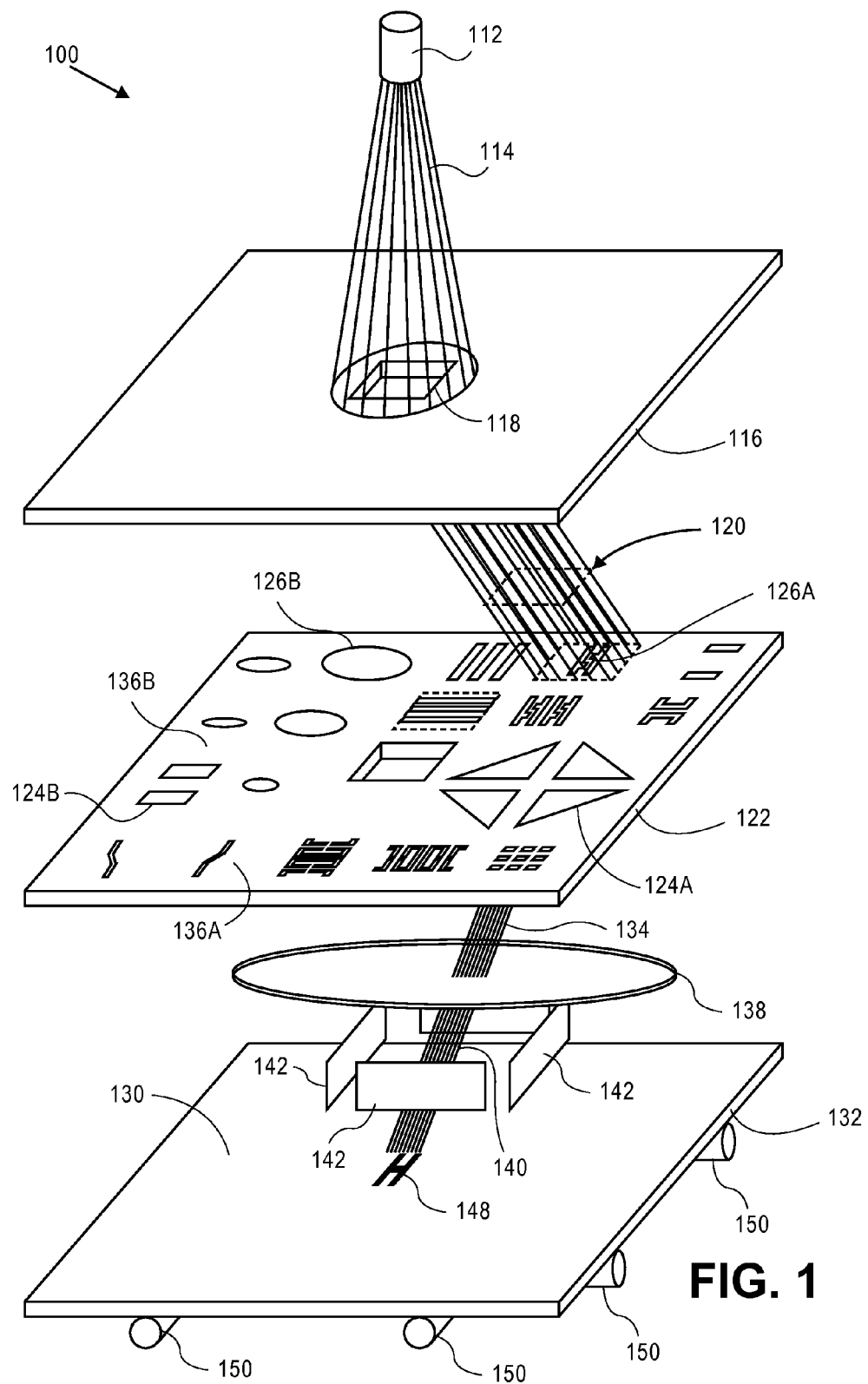
FIG. 1 illustrates an example of a character projection charged particle beam system.

Referring now to the drawings, wherein like numbers refer to like items, FIG. 1 illustrates an embodiment of a conventional lithography system 100, such as a charged particle beam writer system, in this case an electron beam writer system, that employs character projection to manufacture a surface 130. The electron beam writer system 100 has an electron beam source 112 that projects an electron beam 114 toward an aperture plate 116. The plate 116 has an aperture 118 formed therein which allows the electron beam 114 to pass. Once the electron beam 114 passes through the aperture 118 it is directed or deflected by a system of lenses (not shown) as electron beam 120 toward another rectangular aperture plate or stencil mask 122. The stencil 122 has formed therein a number of openings or apertures 124 that define various types of characters 126, which may be complex characters. Each character 126 formed in the stencil 122 may be used to form a pattern 148 on a surface 130 of a substrate 132, such as a silicon wafer, a reticle or other substrate. In partial exposure, partial projection, partial character projection, or variable character projection, electron beam 120 may be positioned so as to strike or illuminate only a portion of one of the characters 126, thereby forming a pattern 148 that is a subset of character 126. For each character 126 that is smaller than the size of the electron beam 120 defined by aperture 118, a blanking area 136, containing no aperture, is designed to be adjacent to the character 126, so as to prevent the electron beam 120 from illuminating an unwanted character on stencil 122. An electron beam 134 emerges from one of the characters 126 and passes through an electromagnetic or electrostatic reduction lens 138 which reduces the size of the pattern from the character 126. In commonly available charged particle beam writer systems, the reduction factor is between 10 and 60. The reduced electron beam 140 emerges from the reduction lens 138, and is directed by a series of deflectors 142 onto the surface 130 as the pattern 148, which is depicted as being in the shape of the letter "H" corresponding to character 126A. The pattern 148 is reduced in size compared to the character 126A because of the reduction lens 138. The pattern 148 is drawn by using one shot of the electron beam system 100. This reduces the overall writing time to complete the pattern 148 as compared to using a variable shape beam (VSB) projection system or method. Although one aperture 118 is shown being formed in the plate 116, it is possible that there may be more than one aperture in the plate 116. Although two plates 116 and 122 are shown in this example, there may be only one plate or more than two plates, each plate comprising one or more apertures.

In conventional charged particle beam writer systems the reduction lens 138 is calibrated to provide a fixed reduction factor. The reduction lens 138 and/or the deflectors 142 also focus the beam on the plane of the surface 130. The size of the surface 130 may be significantly larger than the maximum beam deflection capability of the deflection plates 142. Because of this, patterns are normally written on the surface in a series of stripes. Each stripe contains a plurality of sub-fields, where a sub-field is within the beam deflection capability of the deflection plates 142. The electron beam writer system 100 contains a positioning mechanism 150 to allow positioning the substrate 132 for each of the stripes and sub-fields. In one variation of the conventional charged particle beam writer system, the substrate 132 is held stationary while a sub-field is exposed, after which the positioning mechanism 150 moves the substrate 132 to the next sub-field position. In another variation of the conventional charged particle beam writer system, the substrate 132 moves continuously during the writing process. In this variation involving continuous movement, in addition to deflection plates 142, there may be another set of deflection plates (not shown) to move the beam at the same speed and direction as the substrate 132 is moved.

The minimum size pattern that can be projected with reasonable accuracy onto a surface 130 is limited by a variety of short-range physical effects associated with the electron beam writer system 100 and with the surface 130, which normally comprises a resist coating on the substrate 132. These effects include forward scattering, Coulomb effect, and resist diffusion. Beam blur is a term used to include all of these short-range effects. The most modern electron beam writer systems can achieve an effective beam blur radius or $\beta_f$ in the range of 20 nm to 30 nm. Forward scattering may constitute one quarter to one half of the total beam blur. Modern electron beam writer systems contain numerous mechanisms to reduce each of the constituent pieces of beam blur to a minimum. Some electron beam writer systems may allow the beam blur to be varied during the writing process, from the minimum value available on an electron beam writing system to one or more larger values.

The shot dosage of a charged particle beam writer such as an electron beam writer system is a function of the intensity of the beam source 112 and the exposure time for each shot. Typically the beam intensity remains fixed, and the exposure time is varied to obtain variable shot dosages. The exposure time may be varied to compensate for various long-range effects such as back scatter and fogging in a process called proximity effect correction (PEC). Electron beam writer systems usually allow setting an overall dosage, called a base dosage, that affects all shots in an exposure pass. Some electron beam writer systems perform dosage compensation calculations within the electron beam writer system itself, and do not allow the dosage of each shot to be assigned individually as part of the input shot list, the input shots therefore having unassigned shot dosages. In such electron beam writer systems all shots have the base dosage, before proximity effects correction. Other electron beam writer systems do allow dosage assignment on a shot-by-shot basis. In electron beam writer systems that allow shot-by-shot dosage assignment, the number of available dosage levels may be 64 to 4096 or more, or there may be a relatively few available dosage levels, such as 3 to 8 levels. Some embodiments of the current invention are targeted for use with charged particle beam writing systems which allow assignment of dosage levels.

The mechanisms within electron beam writers have a relatively coarse resolution for calculations. As such, mid-range corrections such as may be required for EUV masks in the range of 2 um cannot be computed accurately by current electron beam writers.

Conventionally, shots are designed so as to completely cover an input pattern with rectangular shots, while avoiding shot overlap wherever possible. Also, all shots are designed to have a normal dosage, which is a dosage at which a relatively large rectangular shot, in the absence of long-range effects, will produce a pattern on the surface which is the same size as is the shot size.

In exposing, for example, a repeated pattern on a surface using charged particle beam lithography, the size of each pattern instance, as measured on the final manufactured surface, will be slightly different, due to manufacturing variations. The amount of the size variation is an essential manufacturing optimization criterion. In current mask masking, a root mean square (RMS) variation of no more than 1 nm (1 sigma) in pattern size may be desired. More size variation translates to more variation in circuit performance, leading to higher design margins being required, making it increasingly difficult to design faster, lower-power integrated circuits. This variation is referred to as critical dimension (CD) variation. A low CD variation is desirable, and indicates that manufacturing variations will produce relatively small size variations on the final manufactured surface. In the smaller scale, the effects of a high CD variation may be observed as line edge roughness (LER). LER is caused by each part of a line edge being slightly differently manufactured, leading to some waviness in a line that is intended to have a straight edge. CD variation is, among other things, inversely related to the slope of the dosage curve at the resist threshold, which is called edge slope. Therefore, edge slope, or dose margin, is a critical optimization factor for particle beam writing of surfaces. In this disclosure, edge slope and dose margin are terms that are used interchangeably.

With conventional fracturing, without shot overlap, gaps or dose modulation, the dose margin of the written shapes is considered immutable: that is, there is no opportunity to improve dose margin by a choice of fracturing options. In modern practice, the avoidance of very narrow shots called slivers is an example of a practical rule-based method that helps to optimize the shot list for dose margin.

In a fracturing environment where overlapping shots and dose-modulated shots can be generated, there is both a need and an opportunity to optimize for dose margin. The additional flexibility in shot combinations allowed by use of shot overlap and dose modulation allows generation of many fracturing solutions that appear to generate the target mask shapes on the surface, but do so only under perfect manufacturing conditions. The use of overlapping shots and dose-modulated shots therefore creates incentive to address the issue of dose margin and its improvement.

Figure 2A:
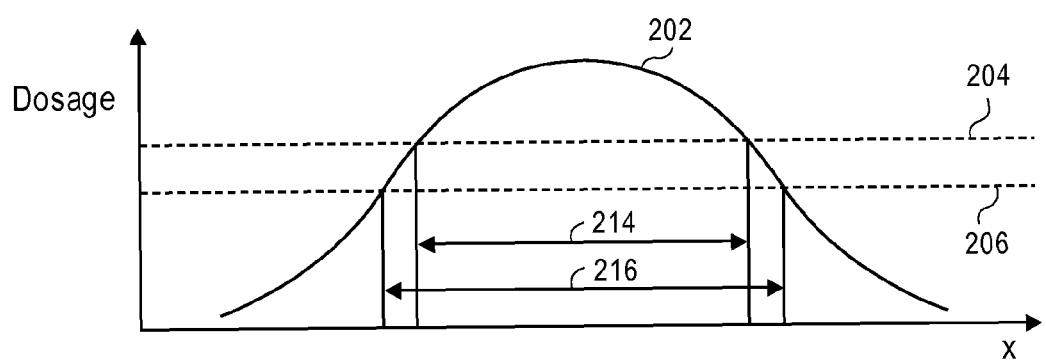
FIG. 2A illustrates an example of a cross-sectional dosage graph, showing the registered pattern widths for each of two resist thresholds.
Figure 2B:
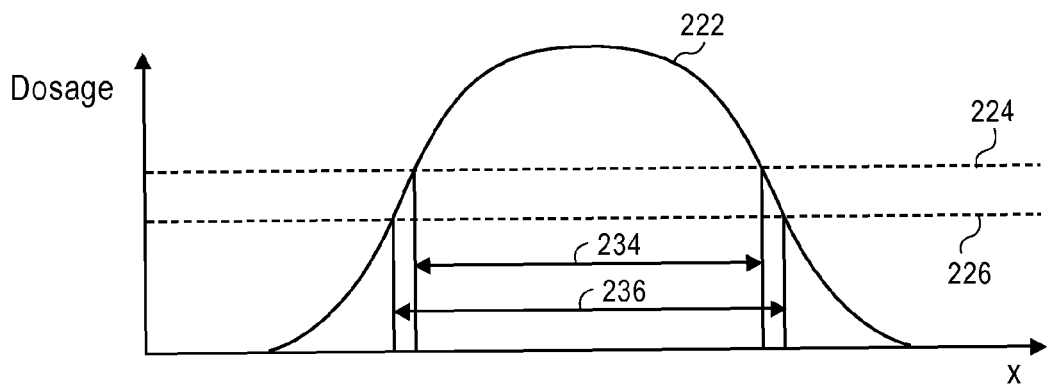
FIG. 2B illustrates an example of a cross-sectional dosage graph similar to FIG. 2A, but with a higher dosage edge slope than in FIG. 2A.

FIG. 2A-B illustrates how critical dimension variation can be reduced by exposing the pattern on the resist so as to produce a relatively high edge slope in the exposure or dosage curve. FIG. 2A illustrates a cross-sectional dosage curve 202, where the x-axis shows the cross-sectional distance through an exposed pattern—such as the distance perpendicular to two of the pattern's edges—and the y-axis shows the dosage received by the resist. A pattern is registered by the resist where the received dosage is higher than a threshold. Two thresholds are illustrated in FIG. 2A, illustrating the effect of a variation in resist sensitivity. The higher threshold 204 causes a pattern of width 214 to be registered by the resist. The lower threshold 206 causes a pattern of width 216 to be registered by the resist, where width 216 is greater than width 214. FIG. 2B illustrates another cross-sectional dosage curve 222. Two thresholds are illustrated, where threshold 224 is the same as threshold 204 of FIG. 2A, and threshold 226 is the same as threshold 206 of FIG. 2A. The slope of dosage curve 222 is higher in the vicinity of the two thresholds than is the slope of dosage curve 202. For dosage curve 222, the higher threshold 224 causes a pattern of width 234 to be registered by the resist. The lower threshold 226 causes a pattern of width 236 to be registered by the resist. As can be seen, the difference between width 236 and width 234 is less than the difference between width 216 and width 214, due to the higher edge slope of dosage curve 222 compared to dosage curve 202. If the resist-coated surface is a reticle, then the lower sensitivity of curve 222 to variation in resist threshold can cause the pattern width on a photomask manufactured from the reticle to be closer to the target pattern width, thereby increasing the yield of usable integrated circuits when the photomask is used to transfer a pattern to a substrate such as a silicon wafer. Similar improvement in tolerance to variation in dose for each shot is observed for dose curves with higher edge slopes. Achieving a relatively higher edge slope such as in dosage curve 222 is therefore desirable.

FIG. 3A illustrates an example of a designed pattern 302. Pattern 302 is designed to have a constant width 306, the width being 100 nm. Pattern 302 comprises a line-end 304. FIG. 3B illustrates an example of a simulated pattern 312 that may be formed on a surface using a conventional VSB shot, where the VSB shot is a 100 nm wide rectangle, and of a normal dosage. As can be seen in FIG. 3B, the line-end portion 314 of pattern 312 has rounded corners, due to beam blur caused by the physical limitations of the charged particle beam writer. Additionally, the exposed pattern has a poor edge slope in sections 316 and 318 of the pattern perimeter. This edge slope may be determined, for example, using particle beam simulation. The portions 316 and 318 of the pattern 312 may cause an undesirably-large variation in size due to manufacturing variation. The line-end 314, in its center section, however, is the desired length—i.e. having the same y-coordinate as the designed line-end 304.

FIG. 4A illustrates an example of a designed pattern 402. Pattern 402 is designed to have a constant width 406 of 80 nm. Pattern 402 comprises a line-end 404, where the y-coordinate of the line-end 404 is shown by reference line 408. FIG. 4B illustrates an example of a simulated pattern 412 that may be formed on a surface using a conventional VSB shot, where the VSB shot is 80 nm wide, and of a normal dosage. As with pattern 312, the line-end portion 414 of pattern 412 has rounded corners due to beam blur. Also, the portions 416 and 418 of the perimeter of pattern 412 have poor edge slope. As can be seen, the portions 416 and 418 of the perimeter of pattern 412 having poor edge slope are larger than the portions 316 and 318 of pattern 312 which have poor edge slope. This is due to the narrower 80 nm width of pattern 402 compared to the 100 nm width of pattern 302. Additionally, the y-coordinate of formed line-end 414 is larger than the y-coordinate of the reference line 408, meaning that pattern 412 has line-end shortening, which can affect the performance and/or functionality of an integrated circuit fabricated using a mask containing pattern 412.

FIG. 5A illustrates an example of a designed pattern 502. Pattern 502 is designed to have a constant width 508 of 60 nm. Pattern 502 comprises a line-end 504, where the y-coordinate of line-end 504 is shown by reference line 506. FIG. 5B illustrates an example of a pattern 512 that may be formed on a surface using a conventional VSB shot, where the VSB shot is 60 nm wide, and of a normal dosage. As can be seen, the line-end portion 514 of pattern 512 is very rounded. There is also line-end shortening—the minimum y-coordinate of pattern 512 is greater than the y-coordinate of reference line 506. Additionally, the perimeter region 518 of pattern 512 has a poor edge slope, affecting the entire line-end 514.

The patterns of FIGS. 3B, 4B and 5B illustrate how formation of patterns of 80 nm width and below may have line-end shortening, and may also have rounded corners with poor edge slope, when formed with conventional VSB shots.

Figure 6:
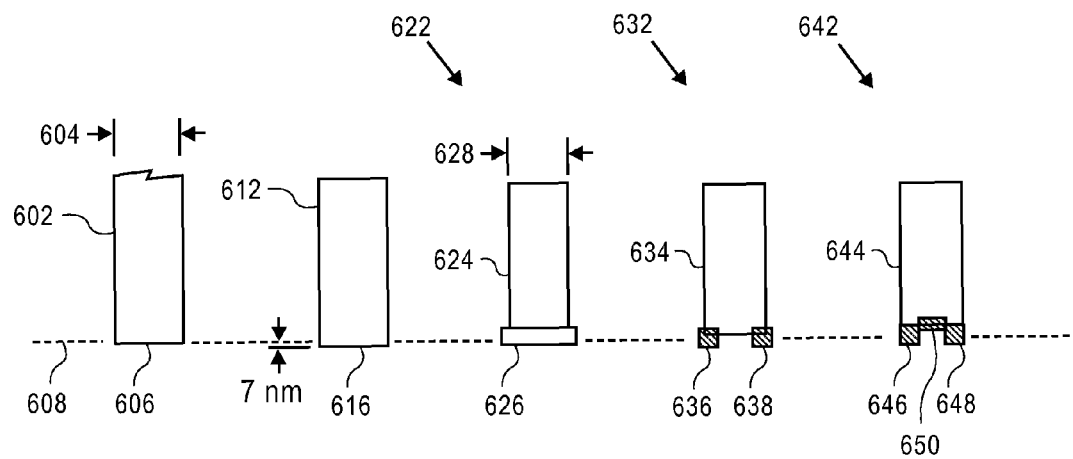
FIG. 6 illustrates various examples of groups of shots that may be used to form a 80 nm line-end pattern.
Figure 7:
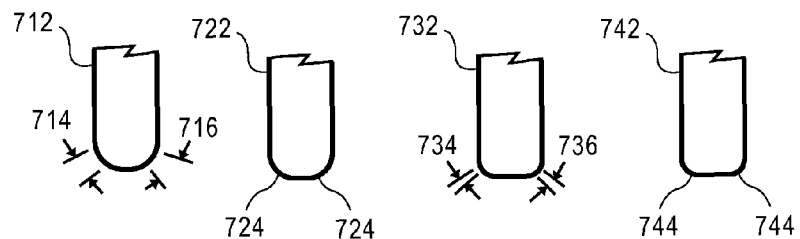
FIG. 7 illustrates simulated patterns formed by the various shot groups of FIG. 6.

FIG. 6 illustrates various methods of fracturing a pattern to enhance the quality of the pattern formed on a surface such as a reticle. Shape 602 illustrates a designed line-end pattern, the pattern 602 having a width 604 of 80 nm. The pattern 602 comprises a line-end 606. Dashed line 608 denotes the y-coordinate of line-end 606. FIG. 6 pattern 612 illustrates one prior art method of fracturing pattern 602 to improve the quality of the formed pattern on a surface, compared with FIG. 4B pattern 412. Pattern 612 illustrates a single VSB shot, where the shot size has been expanded in the negative y-dimension, so that the minimum y-coordinate of the shot is 7 nm less than reference y-coordinate 608. The dose of shot 612 is a normal dose. FIG. 7 pattern 712 illustrates a simulated shape of the shot 612. The line end of pattern 712 has rounded corners, and also has perimeter regions 714 and 716 in which the edge slope of the pattern is too low.

FIG. 6 also illustrates three groups of VSB shots, group 622, group 632 and group 642, which can form the pattern 602. Shot group 632 and shot group 642 exemplify one embodiment of the current invention while shot group 622 represents a prior art method. Shot group 622 consists of shot 624 and shot 626, which do not overlap each other. Shot 624 is shot at 1.2 times a normal dose, before long-range PEC, and shot 626 is shot at a normal dose. The width 628 of shot 624 is less than 604, and is calculated so as to produce a pattern of width 604 on the surface with the larger-than-normal dosage. Shot 626, as can be seen, is extended in the negative and positive x-directions beyond the dimensions of shot 624 and also beyond the dimensions of pattern 602. FIG. 7 pattern 722 illustrates the simulated pattern produced by shot group 622. The line-end corners 724 of pattern 722 have a higher edge slope than pattern 712, with no part of the corner having a too-small edge slope. Additionally, though not illustrated, the higher-than-normal dose of shot 624 improves the edge slope on the left and right sides of pattern 722 compared to pattern 712. One method of determining the shots of shot group 622 is through model-based fracturing, which is the use of simulation, such as charged particle beam simulation, to determine a set of shots which can form a desired pattern on a resist-coated surface, by determining through simulation the pattern which will be produced on the surface from a given set of one or more shots, where some or all of the shots may have non-normal dosages. Alternatively, the shots of shot group 622 may be determined through rule-based methods. Model-based fracturing, although relatively more compute-intensive than rule-based fracturing, may determine a shot list that will produce a more accurate pattern on the surface, compared to a shot list determined using rule-based methods.

FIG. 6 shot group 632 illustrates an exemplary method of fracturing pattern 602 according to one embodiment of the current invention. Shot group 632 consists of shot 634, shot 636 and shot 638. Shots 636 and 638 are illustrated with shading for improved clarity. Shot 634 is shot at a higher-than-normal dose, for example 1.2 times normal dose, and the width of shot 634 is calculated so as to produce a pattern of width 604 on a surface. Shot 636 and shot 638 both overlap shot 634, and both extend below reference y-coordinate 608. The overlap between, for example, shot 634 and 636 is a partial overlap, meaning that the area of intersection between shot 634 and shot 636 is different than either shot. Shot 636 and shot 638 are shot at a normal dose in this example. FIG. 7 pattern 732 illustrates a simulated pattern from shot group 632. Compared to pattern 722, pattern 732 exhibits less corner rounding, but also has worse edge slope on the corners, with the edge slope being less than the minimum acceptable value in perimeter regions 734 and 736. Shot group 632 illustrates how use of overlapping shots and other-than-normal dosages may allow patterns to be formed with higher-fidelity than using conventional non-overlapping shots with normal dosages.

FIG. 6 shot group 642 illustrates another example for fracturing pattern 602 according to the current invention, using partially overlapping shots. Shot group 642 consists of shots 644, 646, 648 and 650. Shots 646, 648 and 650 are illustrated with shading for improved clarity. Like shots 624 and 634, shot 644 uses a higher-than-normal dose such as of 1.2× normal. Shots 646, 648 and 650 use a normal dose in this example. Shot 650 overlaps shot 644. Shots 646 and 648 extend beyond reference y-coordinate 608. FIG. 7 pattern 742 illustrates a simulated pattern from shot group 642. The corners 744 of the pattern 742 line-end are less rounded than, for example, the corers of pattern 722. Additionally, the edge slope in the corner region is higher-than-minimum at all locations. Like shot group 632, shot group 642 illustrates how use of overlapping shots combined with other-than-normal dosages may allow patterns to be formed with higher-fidelity than with conventional methods or prior art methods such as illustrated with the method of shot 612.

The solution described above and illustrated in FIG. 6 shot groups 632 and 642 may be implemented even using a charged particle beam system that does not allow dosage assignment for individual shots. In one embodiment of the present invention, a small number of dosages may be selected, for example two dosages such as 1.0× normal and 1.2× normal, and shots for each of these two dosages may be separated and exposed in two separate exposure passes, where the base dosage for one exposure pass is 1.0× normal and the base dosage for the other exposure pass is 1.2× normal. For example, in FIG. 6 shot group 632, shot 636 and shot 638 may be assigned to a first exposure pass using a base dosage of 1.0× normal dosage, and shot 634 may be assigned to a second exposure pass using a base dosages of 1.2× normal dosage. In this embodiment, the union of shots for any exposure pass will be different than the union of shots for all of the exposure passes combined.

In other embodiments of the current invention, sensitivity to types of manufacturing variation other than dosage variation may be reduced by using overlapping shots. Beam blur variation is an example of another type of manufacturing variation. Additionally, the methods of the current invention may also be practiced using complex character projection (CP) shots, or with a combination of complex CP and VSB shots.

Figure 8A:
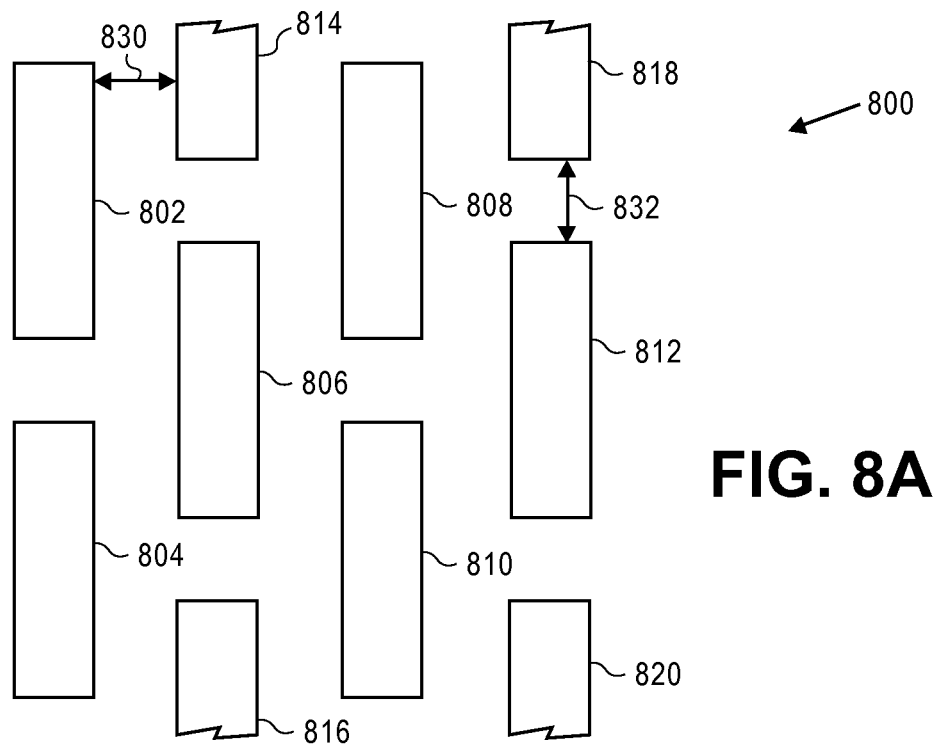
FIG. 8A illustrates an example of a group of rectangular patterns to be formed on a surface.

FIG. 8A illustrates an example of a group of rectangular patterns 800 to be formed on a surface. The group of patterns 800 comprises six complete rectangles, including rectangle 802, rectangle 804, rectangle 806, rectangle 808, rectangle 810 and rectangle 812. Additionally, portions of four additional rectangles are illustrated: rectangle 814, rectangle 816, rectangle 818 and rectangle 820. As can be seen, the rectangles are arranged in a regular pattern with columns, where adjacent columns are separated by a space 830, and where adjacent rectangles within a column are separated by a space 832.

Figure 8B:
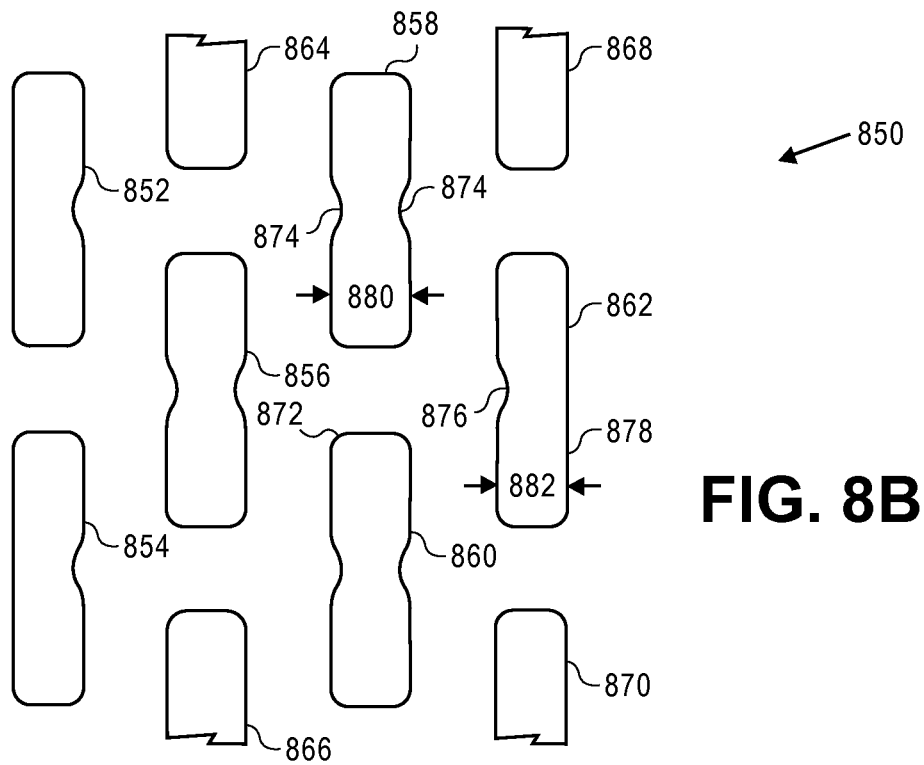
FIG. 8B illustrates an example of how the patterns of FIG. 8A may be formed on a surface using conventional non-overlapping VSB shots, in the presence of mid-range scattering.

Pattern group 800 can be written to a surface using conventional non-overlapping VSB shots, using one VSB shot for each pattern in pattern group 800. FIG. 8A can therefore also be viewed as a group of shots 800, comprising shots 802, 804, 806, 808, 810, 812, 814, 816, 818, and 820. FIG. 8B illustrates an example of a set of simulated patterns 850 that may be produced from shot group 800, in the presence of mid-range scattering. Set of patterns 850 comprises six whole patterns, including pattern 852, pattern 854, pattern 856, pattern 858, pattern 860 and pattern 862. Pattern group 850 also comprises four additional patterns where only a portion of the pattern is illustrated in FIG. 8B, including pattern 864, pattern 866, pattern 868 and pattern 870. The patterns in pattern group 850 exhibit corner rounding due to beam blur, one example of which is corner 872. Additionally, the middle portion, measured in the y-direction, of each pattern in the middle two columns is narrower in the x-direction than is the rest of the pattern, as illustrated by middle portion 874 of pattern 858. This narrowing is the result of less mid-range scattering energy reaching the middle portion 874 of pattern 858 than reaches other portions of pattern 858. In pattern 858, pattern narrowing in region 874 is caused by the gap between shots 814 and 806, and by the gap between shots 818 and 812. Less mid-range scattering energy reaches the resist in the vicinity of pattern 858 opposite these gaps, compared to opposite shots 814, 806, 818 and 812. Outside column patterns 852, 854, 868, 862 and 870 exhibit asymmetrical narrowing because of their having neighboring shots on only one of the left or right sides. Inward-facing sides have a similar narrowing as pattern 858, as illustrated with narrowing region 876 of pattern 862. On outside-facing edges such as edge 878 of pattern 862 the lack of a neighboring pattern causes lower mid-range scattering energy to be received along the entire edge, with the consequence that the entire edge 878 is offset in the −x (negative x) direction, causing the width 882 of pattern 862 to be less than width 880 of pattern 858. This simulated midrange scattering is similar in range of effect to the midrange scattering of reticles for EUV optical lithography, but the midrange scattering simulated in pattern group 850 is of a higher intensity than current EUV reticles commonly produce. Pattern group 850 illustrates how mid-range scattering of a sufficient magnitude can affect patterns written by charged particle beam lithography.

Figure 9A:
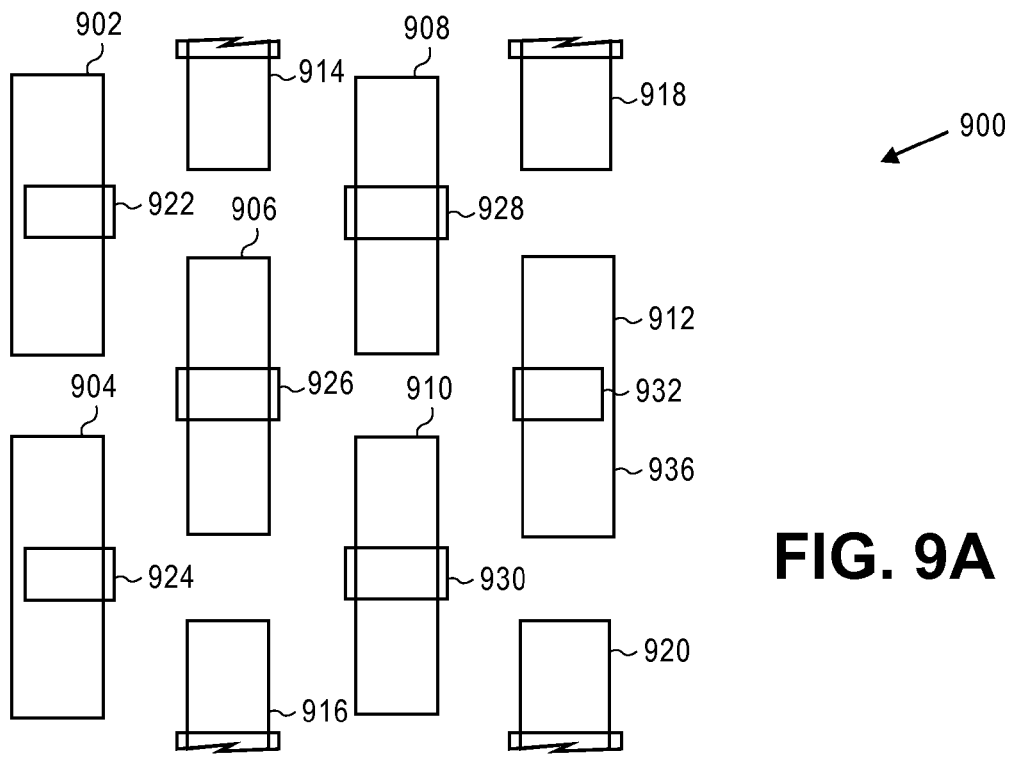
FIG. 9A illustrates an example of a set of overlapping VSB shots that may be used to form the patterns of FIG. 8A on a surface.

In another embodiment of the current invention, overlapping shots may be used to implement mask process correction, thereby producing higher fidelity patterns in the presence of mid-range scattering. FIG. 9A illustrates a shot group 900 that may be used to produce the group of patterns 800. Shot group 900 comprises rectangular shots 902, 904, 906, 908, 910 and 912. Shot group 900 also comprises rectangular shots 914, 916, 918 and 920, only portions of which are illustrated. Compared to shot group 800, shot group 900 includes the following:

Shots on the outside columns are widened on their outside edges. This includes shots 902, 904, 918, 912 and 920. In shot 912, for example, edge 936 has been moved in the +x direction, compared to shot 812.

Additional shots are added to prevent the pattern narrowing in the middle portion of the patterns as illustrated in pattern group 850. The added shots include shots 922, 924, 926, 928, 930 and 932. These added shots deliver additional dosage to areas, with the exception of outside edges of outside column shots, that will receive less mid-range scattering dosage. Since on the outside columns of shot group 900, pattern narrowing is prevented by widening shots 902, 904, 918, 912 and 920 on their outside edges as described above, overlapping shots 922, 924 and 932 are positioned away from the outside edges of shots 902, 904 and 912 to prevent excessive middle-portion widening of the patterns formed by shots 902, 904 and 912.

Figure 9B:
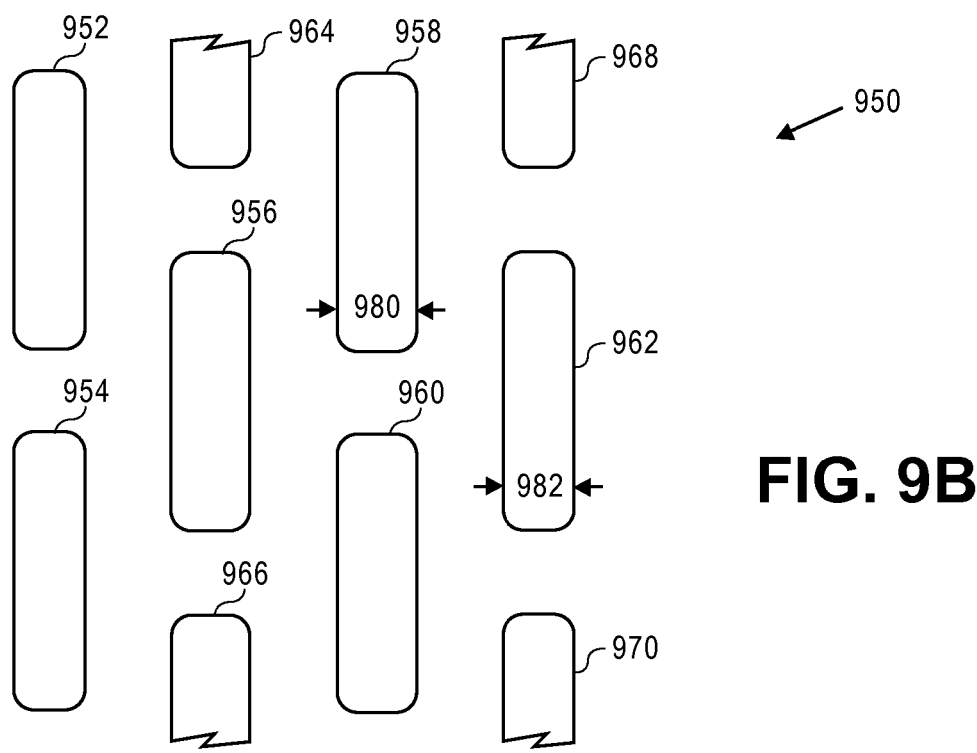
FIG. 9B illustrates an example of a pattern that may be formed on a surface from the shots of FIG. 9A.

FIG. 9B illustrates an example of a group of patterns 950 that may be produced on a surface from group of shots 900. Group of patterns 950 comprises patterns 952, 954, 956, 958, 960 and 962, and partial patterns 964, 966, 968 and 970. As can be seen, the exposure changes illustrated in group of shots 900 compared to group of shots 800 improve the fidelity of the patterns produced on the surface, in the presence of mid-range scattering. Narrowing of the middle portions of patterns is absent. Additionally, the widths of exterior column patterns, such as width 982 of pattern 962, are the same as the widths of interior column patterns, such as width 980 of pattern 958.

The calculations described or referred to in this invention may be accomplished in various ways. Generally, calculations may be accomplished by in-process, pre-process or post-process methods. In-process calculation involves performing a calculation when its results are needed. Pre-process calculation involves pre-calculating and then storing results for later retrieval during a subsequent processing step, and may improve processing performance, particularly for calculations that may be repeated many times. Calculations may also be deferred from a processing step and then done in a later post-processing step. An example of pre-process calculation is a shot group, which is a pre-calculation of dosage pattern information for one or more shots associated with a given input pattern or set of input pattern characteristics. The shot group and the associated input pattern may be saved in a library of pre-calculated shot groups, so that the set of shots comprising the shot group can be quickly generated for additional instances of the input pattern, without pattern re-calculation. In some embodiments, the pre-calculation may comprise simulation of the dosage pattern that the shot group will produce on a resist-coated surface. In other embodiments, the shot group may be determined without simulation, such as by using correct-by-construction techniques. In some embodiments, the pre-calculated shot groups may be stored in the shot group library in the form of a list of shots. In other embodiments, the pre-calculated shot groups may be stored in the form of computer code that can generate shots for a specific type or types of input patterns. In yet other embodiments, a plurality of pre-calculated shot groups may be stored in the form of a table, where entries in the table correspond to various input patterns or input pattern characteristics such as pattern width, and where each table entry provides either a list of shots in the shot group, or information for how to generate the appropriate set of shots. Additionally, different shot groups may be stored in different forms in the shot group library. In some embodiments, the dosage pattern which a given shot group can produce may also be stored in the shot group library. In one embodiment, the dosage pattern may be stored as a two-dimensional (X and Y) dosage map called a glyph.

Figure 10:
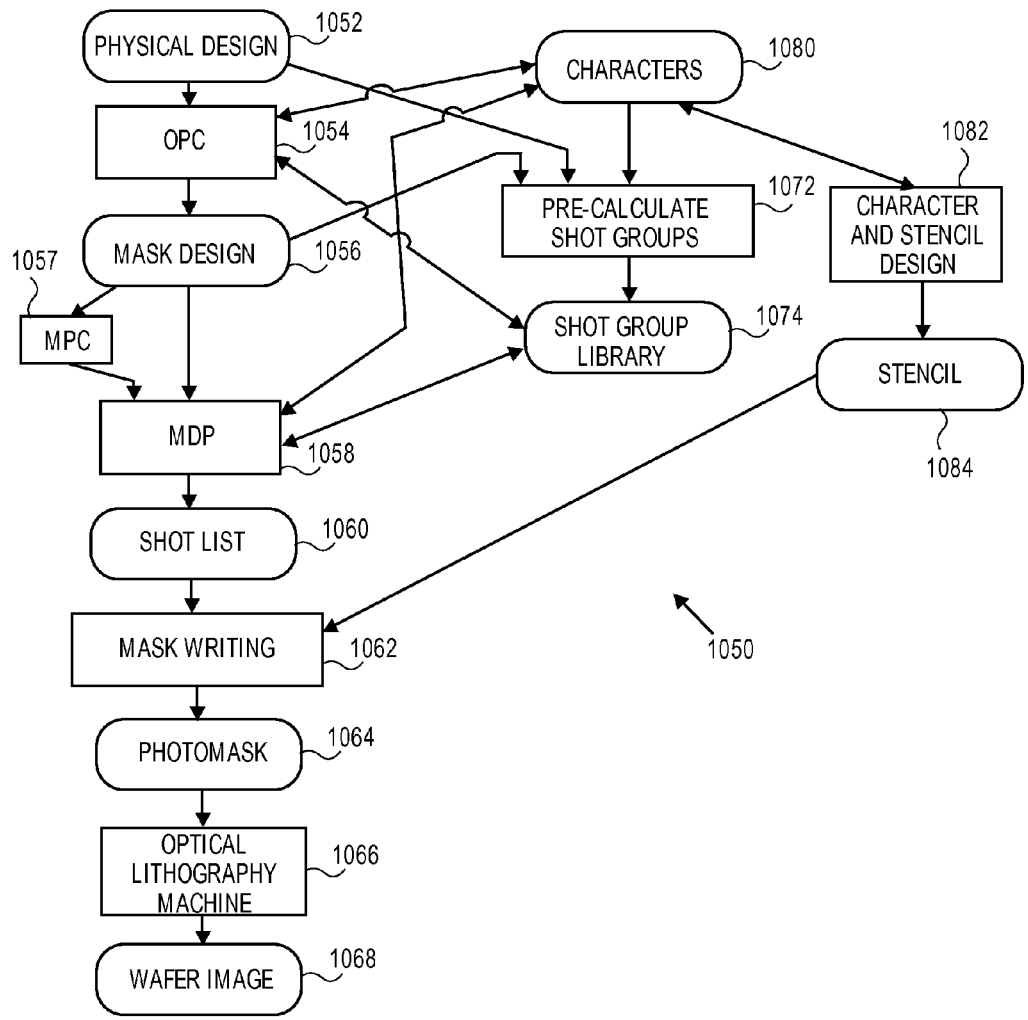
FIG. 10 illustrates a conceptual flow diagram of how to prepare a surface, such as a reticle, for use in fabricating a substrate such as an integrated circuit on a silicon wafer using optical lithography.

FIG. 10 is a conceptual flow diagram 1050 of how to prepare a reticle for use in fabricating a surface such as an integrated circuit on a silicon wafer. In a first step 1052, a physical design, such as a physical design of an integrated circuit, is designed. This can include determining the logic gates, transistors, metal layers, and other items that are required to be found in a physical design such as that in an integrated circuit. The physical design may be rectilinear, partially curvilinear, or completely curvilinear. Next, in a step 1054, optical proximity correction is determined. In an embodiment of this disclosure, this can include taking as input a library of pre-calculated shot groups from a shot group library 1074. This can also alternatively, or in addition, include taking as input a library of pre-designed characters 1080 including complex characters that are to be available on a stencil 1084 in a step 1062. In an embodiment of this disclosure, an OPC step 1054 may also include simultaneous optimization of shot count or write times, and may also include a fracturing operation, a shot placement operation, a dose assignment operation, or may also include a shot sequence optimization operation, or other mask data preparation operations, with some or all of these operations being simultaneous or combined in a single step. The OPC step may create partially or completely curvilinear patterns. The output of the OPC step 1054 is a mask design 1056.

Mask process correction (MPC) 1057 may optionally be performed on the mask design 1056. MPC modifies the pattern to be written to the reticle, compensating for effects such as the narrowing of patterns which are less than about 100 nm wide. In a step 1058, a mask data preparation (MDP) operation which may include a fracturing operation, a shot placement operation, a dose assignment operation, or a shot sequence optimization may take place. MDP may use as input the mask design 1056 or the results of MPC 1057. In some embodiments of the present invention, MPC may be performed as part of a fracturing or other MDP operation. Other corrections may also be performed as part of fracturing or other MDP operation, the possible corrections including: forward scattering, resist diffusion, Coulomb effect, etching, backward scattering, fogging, loading, resist charging, and EUV midrange scattering. The result of MDP step 1058 is a shot list 1060. Either the OPC step 1054 or of the MDP step 1058, or a separate program 1072 can include pre-calculating one or more shot groups that may be used for a given input pattern, and storing this information in a shot group library 1074. Combining OPC and any or all of the various operations of mask data preparation in one step is contemplated in this disclosure. Mask data preparation step 1058, which may include a fracturing operation, may also comprise a pattern matching operation to match pre-calculated shot groups to create a mask that matches closely to the mask design. Mask data preparation may also comprise reducing the sensitivity of the pattern written in step 1062 to manufacturing variation. Mask data preparation may also comprise inputting patterns to be formed on a surface with the patterns being slightly different, selecting a set of characters to be used to form the number of patterns, the set of characters fitting on a stencil mask, the set of characters possibly including both complex and VSB characters, and the set of characters based on varying character dose or varying character position or varying the beam blur radius or applying partial exposure of a character within the set of characters or dragging a character to reduce the shot count or total write time. A set of slightly different patterns on the surface may be designed to produce substantially the same pattern on a substrate. Also, the set of characters may be selected from a predetermined set of characters. In one embodiment of this disclosure, a set of characters available on a stencil in a step 1080 that may be selected quickly during the mask writing step 1062 may be prepared for a specific mask design. In that embodiment, once the mask data preparation step 1058 is completed, a stencil is prepared in a step 1084. In another embodiment of this disclosure, a stencil is prepared in the step 1084 prior to or simultaneous with the MDP step 1058 and may be independent of the particular mask design. In this embodiment, the characters available in the step 1080 and the stencil layout are designed in step 1082 to output generically for many potential mask designs 1056 to incorporate patterns that are likely to be output by a particular OPC program 1054 or a particular MDP program 1058 or particular types of designs that characterizes the physical design 1052 such as memories, flash memories, system on chip designs, or particular process technology being designed to in physical design 1052, or a particular cell library used in physical design 1052, or any other common characteristics that may form different sets of slightly different patterns in mask design 1056. The stencil can include a set of characters, such as a limited number of characters that was determined in the step 1058.

The shot list 1060 is used to generate a surface in a mask writing step 1062, which uses a charged particle beam writer such as an electron beam writer system. Mask writing step 1062 may use stencil 1084 containing a plurality of complex characters, or may use a stencil comprising only VSB apertures. The electron beam writer system projects a beam of electrons through the stencil onto a surface to form patterns in a surface, as shown in a step 1064. The completed surface may then be used in an optical lithography machine, which is shown in a step 1066. Finally, in a step 1068, a substrate such as a silicon wafer is produced. As has been previously described, in step 1080 characters may be provided to the OPC step 1054 or the MDP step 1058. The step 1080 also provides characters to a character and stencil design step 1082 or a shot group generation step 1072. The character and stencil design step 1082 provides input to the stencil step 1084 and to the characters step 1080. The shot group generation step 1072 provides information to the shot group library 1074. Also, a shot group pre-calculation step 1072 may use as input the physical design 1052 or the mask design 1056, and may pre-calculate one or more shot groups, which are stored in a shot group library 1074.

Figure 11A:
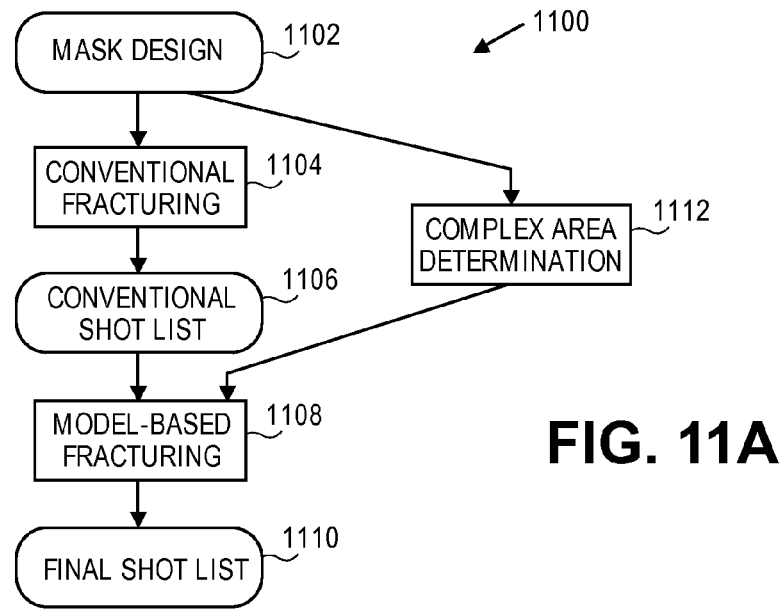
FIG. 11A illustrates a conceptual flow diagram of one method of combining model-based and conventional fracturing in the same design.

Model-based fracturing may be combined with conventional fracturing in a single design. This allows, for example, model-based fracturing to be used in those areas where it can provide the greatest benefit, while using conventional fracturing, which is less computationally intensive, for other parts of the design. As previously indicated, in conventional fracturing, shot overlap is avoided whenever possible, and all shots have a normal dosage before long-range correction. In FIG. 11A conceptual flow diagram 1100 illustrates one embodiment for how conventional and model-based fracturing may be combined. The input to the combined fracturing process is mask design 1102. Mask design 1102 may be mask design 1056 from FIG. 10, or it may be a part of mask design 1056, or an altered form of mask design 1056 such as from MPC 1057. Conventional fracturing 1104 is performed on the mask design 1102 to create a conventional shot list 1106. Alternatively, conventional fracturing may be performed on parts of the mask design 1102, leaving some parts unfractured. A model-based fracturing step 1108 then inputs the shot list 1106 and modifies, adds, or deletes shots in complex areas of a design. Complex areas may include, for example, areas with the smallest patterns, or areas with curvilinear patterns. Complex areas may also include areas with high influence from midrange scattering. Complex areas may also include "hot spots" of particular sensitivity in manufacturing. The word "complex" in this context may not mean geometric complexity of the shapes. In some embodiments, the model-based fracturing 1108 may include determining in which areas to modify and/or replace conventional shots with model-base shots. In other embodiments the complex areas may be determined in a separate step 1112, either automatically from mask design 1056, or manually. In any case, model-based fracturing 1108 generates shots, some of which partially overlap other shots. The model-based fracturing may replace or modify some or all of the conventional shots in the designated or determined complex portions of the design with shots that have been determined using model-based techniques. The output of the model-based fracturing step 1108 is a final shot list 1110, containing both conventional and model-based shots. Final shot list 1108 corresponds to FIG. 10 shot list 1060. With regard to coarse grain parallel processing of the steps in conceptual flow diagram 1100, the mask design 1102 may be a partial design, or it may be the entire design where each of the steps may be performed in parallel.

Figure 11B:
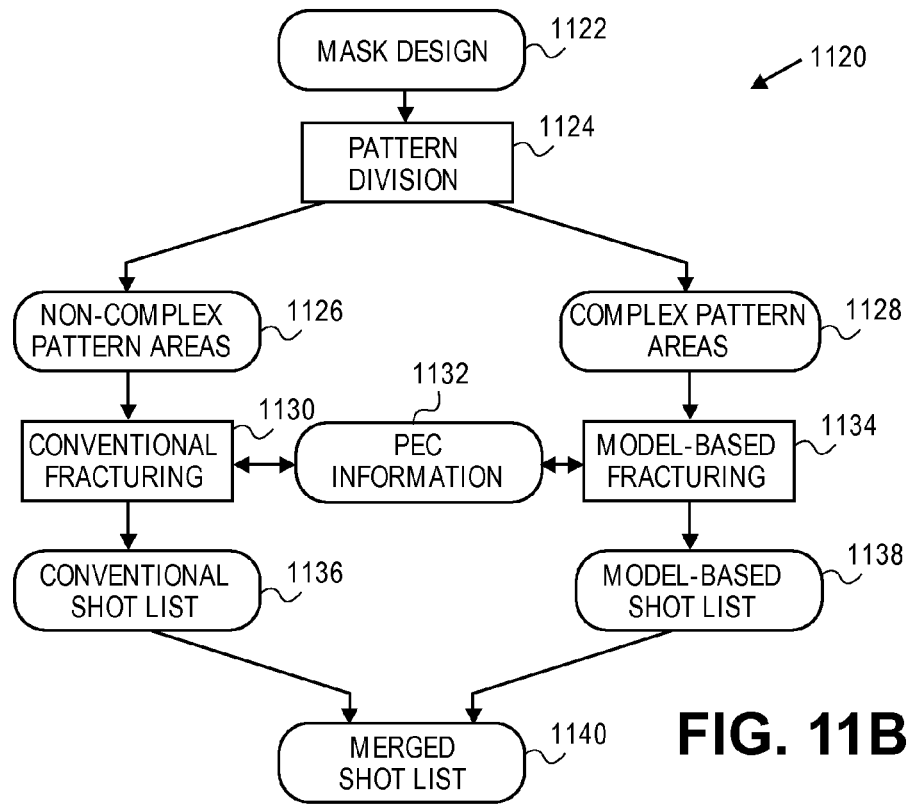
FIG. 11B illustrates a conceptual flow diagram of another method of combining model-based and conventional fracturing in the same design.

FIG. 11B conceptual flow diagram 1120 illustrates another embodiment of how conventional and model-based fracturing may be combined. The input to the combined fracturing process is mask design 1122. Mask design 1122 may be mask design 1056 from FIG. 10, or it may be a part of mask design 1056, or an altered form of mask design 1056 such as from MPC 1057. In FIG. 11B the mask design 1122 is processed by pattern division step 1124, which separates the pattern data into non-complex pattern area 1126 and complex pattern area 1128. A conventional fracturing step 1130 uses the non-complex pattern area 1126 as input. The conventional fracturing 1130 outputs a list of conventional shots 1136. An additional output is PEC information 1132. In some embodiments this information may be one or more forms directly usable by PEC. In other embodiments, the PEC information may be, for example, the conventional shot list itself, from which PEC information may be calculated. The complex pattern area 1128 is fractured using model-based fracturing 1134. Model-based fracturing 1134 may use the PEC information 1132 as input, processing this information if necessary to derive the appropriate PEC corrections for the model-based shots which are within the influence range of the long-range effects from the conventional shots. In other embodiments, the PEC information may also be output by model-based fracturing 1134, and conventional fracturing 1130 may use this information in some way. Model-based fracturing 1134 creates a model-based shot list 1138. The conventional shot list 1136 and the model-based shot list 1138 are then merged into a merged shot list 1140, which corresponds to FIG. 10 shot list 1060. With regard to coarse grain parallel processing of the steps in conceptual flow diagram 1120, the mask design 1122 may be a partial design, or it may be the entire design where each of the steps may be performed in parallel.

The fracturing, mask data preparation, proximity effect correction and shot group creation flows described in this disclosure may be implemented using general-purpose computers with appropriate computer software as computation devices. Due to the large amount of calculations required, multiple computers or processor cores may also be used in parallel. In one embodiment, the computations may be subdivided into a plurality of 2-dimensional geometric regions for one or more computation-intensive steps in the flow, to support parallel processing. In another embodiment, a special-purpose hardware device, either used singly or in multiples, may be used to perform the computations of one or more steps with greater speed than using general-purpose computers or processor cores. In one embodiment, the special-purpose hardware device may be a graphics processing unit (GPU). In another embodiment, the optimization and simulation processes described in this disclosure may include iterative processes of revising and recalculating possible solutions, so as to minimize either the total number of shots, or the total charged particle beam writing time, or some other parameter. In yet another embodiment, an initial set of shots may be determined in a correct-by-construction method, so that no shot modifications are required.

While the specification has been described in detail with respect to specific embodiments, it will be appreciated that those skilled in the art, upon attaining an understanding of the foregoing, may readily conceive of alterations to, variations of, and equivalents to these embodiments. These and other modifications and variations to the present methods for fracturing, mask data preparation, proximity effect correction and optical proximity correction may be practiced by those of ordinary skill in the art, without departing from the spirit and scope of the present subject matter, which is more particularly set forth in the appended claims. Furthermore, those of ordinary skill in the art will appreciate that the foregoing description is by way of example only, and is not intended to be limiting. Steps can be added to, taken from or modified from the steps in this specification without deviating from the scope of the invention. In general, any flowcharts presented are only intended to indicate one possible sequence of basic operations to achieve a function, and many variations are possible. Thus, it is intended that the present subject matter covers such modifications and variations as come within the scope of the appended claims and their equivalents.

What is claimed is:

1. A method for fracturing or mask data preparation or mask process correction or proximity effect correction for charged particle beam lithography, the method comprising a step of:

determining a plurality of charged particle beam shots that will form a pattern on a surface using a shaped beam charged particle beam writer, wherein at least two charged particle beam shots in the plurality of charged particle beam shots partially overlap, and wherein sensitivity of the pattern on the surface to manufacturing variation is reduced, and wherein the step of determining is performed using one or more computing hardware processors, and wherein the sensitivity to manufacturing variation is reduced by increasing edge slope, compared to use of non-overlapping normal dosage variable shaped beam (VSB) shots to form the pattern.

2. The method of claim 1 wherein the step of determining comprises calculating the pattern on the surface from the plurality of charged particle beam shots.

3. The method of claim 2 wherein the calculation comprises charged particle beam simulation.

4. The method of claim 3 wherein the charged particle beam simulation includes at least one of a group of short-range effects consisting of forward scattering, resist diffusion, Coulomb effect, and etching.

5. The method of claim 3 wherein the surface is an extreme ultraviolet (EUV) reticle, and wherein the charged particle beam simulation includes EUV mid-range scattering.

6. The method of claim 3 wherein the charged particle beam simulation includes at least one of a group of long-range effects consisting of backward scattering, fogging, loading and resist charging.

7. The method of claim 1 wherein each charged particle beam shot in the plurality of charged particle beam shots comprises an assigned dosage, and wherein the assigned dosage of a first charged particle beam shot in the plurality of charged particle beam shots is different from the assigned dosage of a second charged particle beam shot in the plurality of charged particle beam shots, before long-range correction.

8. The method of claim 1 wherein in the step of determining, the pattern on the surface is a first pattern, the method further comprising the step of generating a set of non-overlapping normal dosage variable shaped beam (VSB) shots that will form a second pattern on the surface, wherein the first pattern and the second pattern are adjacent.

9. The method of claim 8 wherein short-range and/or long-range effects from the set of non-overlapping VSB shots are used in the step of determining.

10. The method of claim 1 wherein charged particle beam shots in the plurality of charged particle beam shots are variable shaped beam (VSB) shots.

11. The method of claim 1 wherein the plurality of charged particle beam shots is exposed in a single exposure pass.

12. The method of claim 1, further comprising the steps of:
inputting a set of non-overlapping variable shaped beam (VSB shots of normal dosage that will form the pattern on the surface; and
replacing some or all VSB shots in the set of VSB shots with the determined plurality of charged particle beam shots.

13. A method for fracturing or mask data preparation or mask process correction or proximity effect correction for charged particle beam lithography, the method comprising steps of:
inputting a desired pattern to be formed on a surface; and
determining a plurality of charged particle beam shots that will form the pattern on the surface using a shaped beam charged particle beam writer, wherein at least two charged particle beam shots in the plurality of charged particle beam shots partially overlap, and wherein the plurality of charged particle beam shots will form a pattern on the surface which is closer to the desired pattern, compared to a pattern formed from non-overlapping normal dosage variable shaped beam (VSB) shots, and wherein the step of determining is performed using one or more computing hardware processors, and wherein the sensitivity to manufacturing variation is reduced by increasing edge slope, compared to use of non-overlapping normal dosage VSB shots to form the pattern.

14. The method of claim 13 wherein the step of determining comprises calculating the pattern on the surface from the plurality of charged particle beam shots.

15. The method of claim 14 wherein the calculation comprises charged particle beam simulation.

16. A system for fracturing or mask data preparation or mask process correction or proximity effect correction for charged particle beam lithography comprising:
a device for determining a plurality of charged particle beam shots that will form a pattern on a surface, wherein at least two charged particle beam shots in the plurality of charged particle beam shots partially overlap, and wherein sensitivity of the pattern on the surface to manufacturing variation is reduced, and wherein the sensitivity to manufacturing variation is reduced by increasing edge slope, compared to use of non-overlapping normal dosage variable shaped beam (VSB) shots to form the pattern.

* * * * *